(12) United States Patent
Lin

(10) Patent No.: US 7,320,515 B2
(45) Date of Patent: Jan. 22, 2008

(54) POLARIZED OPTICAL LENS

(75) Inventor: Juei-Tse Lin, Taipei (TW)

(73) Assignee: Tony Optical Enterprise Co., Ltd., Taipei (TW)

( * ) Notice: Subject to any disclaimer, the term of this patent is extended or adjusted under 35 U.S.C. 154(b) by 62 days.

(21) Appl. No.: 11/281,724

(22) Filed: Nov. 18, 2005

(65) Prior Publication Data

US 2007/0115428 A1 May 24, 2007

(51) Int. Cl.
*G02C 7/10* (2006.01)
*G02C 7/12* (2006.01)
*B29D 7/01* (2006.01)

(52) U.S. Cl. .................. 351/163; 351/49; 264/1.32; 264/1.34

(58) Field of Classification Search ................ 351/163, 351/49
See application file for complete search history.

(56) References Cited

U.S. PATENT DOCUMENTS

| 2003/0038916 A1* | 2/2003 | Nakano et al. ............. 349/158 |
| 2003/0184863 A1* | 10/2003 | Nakagoshi .................. 359/491 |
| 2006/0182972 A1* | 8/2006 | Bhalakia et al. ......... 428/411.1 |

* cited by examiner

*Primary Examiner*—Jordan M. Schwartz
(74) *Attorney, Agent, or Firm*—Troxell Law Office, PLLC

(57) ABSTRACT

A method of forming a polarized optical lens including an optical lens of certain curvature and a polarized piece, wherein the polarized piece is made up of cellulose protective film, adhesive and polarized thin film, and is pressed to matched curvature as injected and plasticized optical lens. The cellulose protective film of the polarized piece is then peeled off, and through the use of injection and plasticization principle, polarized thin film is combined and pasted to the inner surface or outer surface of the optical lens. This synthesized lens is then placed in the ring of an optical mold. Light adjustment and color change liquid colophony is then injected through a through-hole in the ring, and through the clamping of synthesized lens and light adjustment and color change liquid colophony, the whole set then solidifies and forms a shape.

7 Claims, 5 Drawing Sheets

--Prior art--

POLARIZED OPTICAL LENS

BACKGROUND OF THE INVENTION

1. Field of the Invention

This invention relates to a structure improvement for a polarized optical lens, it more specifically relates to a polarized optical lens which is a pressing combination of optical lens and polarized thin film, meanwhile, through a through-hole of a ring, light adjusting and color changing liquid colophony is injected into, then it is solidified, a single polarized optical lens can thus have diversified lens color, it can generate dark and light color change at different ultra-violet value, it not only lets the user feel more comfortable while wearing it, but also lets the optical lens have more diversified color.

2. Description of the Prior Art

People acquires most of the message through the eye, therefore, when someone's vision has trouble, for example, myopia, presbyopia, hyperopia, astigmatism, etc., all have to be corrected by glasses, therefore, optical lenses is strongly related to vision quality, only good quality lens will not harm the eyes, furthermore, since the technology of optical lens advances very fast, its function has shifted from the traditional vision correction to sunshine blocking, multilayer films, asymptote multi-focuses lens, etc.

However, the structure of polarized optical lens is similar to the design of Venetian blinds, it can delete the reflection resulted from deviated light, for example, the deviated light from glass, reflection on the water surface, reflection on the road, reflection on the snow ground, reflection on the windshield of the car, etc., it can effectively filter the reflected light from objects, better vision effect is thus obtained.

In the prior art polarized lens, two optical lenses (A) with certain curvature are used, adhesive is coated in between them and pressure is used to paste polarized piece (B), a polarized optical piece is thus formed, this is as shown in FIG. 1, however, the prior art polarized optical lens is too thick and weighs too much, it creates great inconvenience to the user. Light weight is always the trend for glasses, therefore, the prior art polarized optical lens then gradually becomes obsolete, meanwhile, the production cost can not be lowered due to the use of two glass lens in the prior art polarized optical lens, it creates great burden to the user.

Therefore, the inventor works aggressively to find out a solution through the accumulated professional knowledge and design and manufacturing experience in the polarized optical lens field for so many years. Through many experiments, trial runs and improvement, a manufacturing method which is different than the conventional way of manufacturing polarized optical lens is thud proposed, we hope to enhance our business competitiveness and added value through this.

SUMMARY OF THE INVENTION

The major purpose of the current invention is to provide an improvement structure for polarized optical lens, it has diversified color and lets the users have more choices and enhance their purchase desire.

Another purpose of the current invention is to provide an improvement structure for polarized optical lens, it is thinner and lighter, it effectively reduces manufacturing and material cost, it also lets the user feel more comfortable while wearing it.

Yet another purpose of the current invention is to provide an improvement structure for polarized optical lens, it helps to isolate UV and prevent it from falling directly to the eyes.

Further another purpose of the current invention is to provide an improvement structure for polarized optical lens, it can prevent the generation of inappropriate scratches on the lens and the lens is thus protected.

To achieve the above-mentioned purpose, an improvement structure for polarized optical lens of the current invention comprising of an optical lens with certain curvature and a polarized thin film, first, the polarized piece made up of cellulose protective film, adhesive and polarized thin film is selected, it is compressed to a curvature matched that of the optical lens, then the cellulose protective film on the polarized piece is peeled off to make polarized thin film, then the polarized thin film is pressed and pasted to the optical lens through adhesive, this synthesized lens is then placed in the ring of optical mold, light adjusting and color changing liquid colophony is injected into through the through-hole in the ring, then a clamp is used to clamp tight the whole set of materials, light adjusting and color changing liquid colophony thus solidifies to bond polarized thin film and optical lens, the light adjusting thin film is then pasted to the outer surface of the polarized optical lens and make it become an inner surface.

However, the above description is only an overview of the many features of the current invention. In order to let professionals in this field who read this specification have a better understanding of the detailed structure, application principles, actions and the functions, please refer to the following embodiment accompanied with the drawing attached and the descriptions which can be embodied, in order to help people to have a better understanding of the current invention.

DETAILED DESCRIPTION OF THE PREFERRED EMBODIMENT

Figure 1:
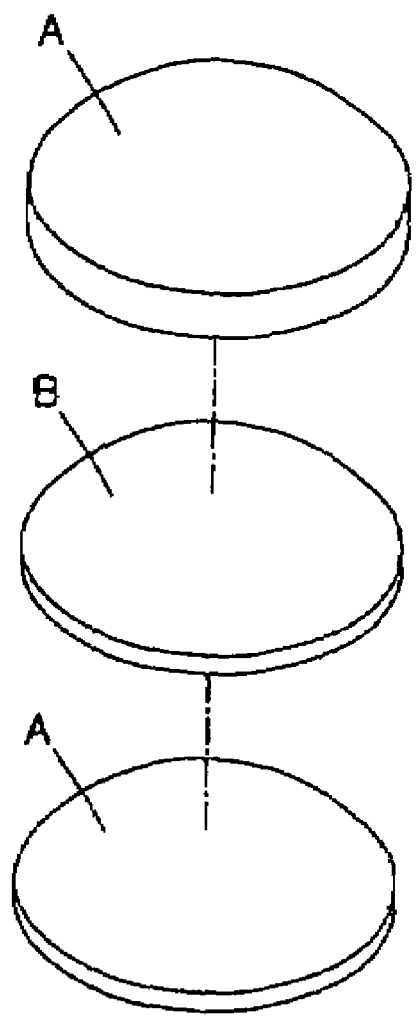
FIG. 1 is a structure illustration of the prior art.
Figure 2:
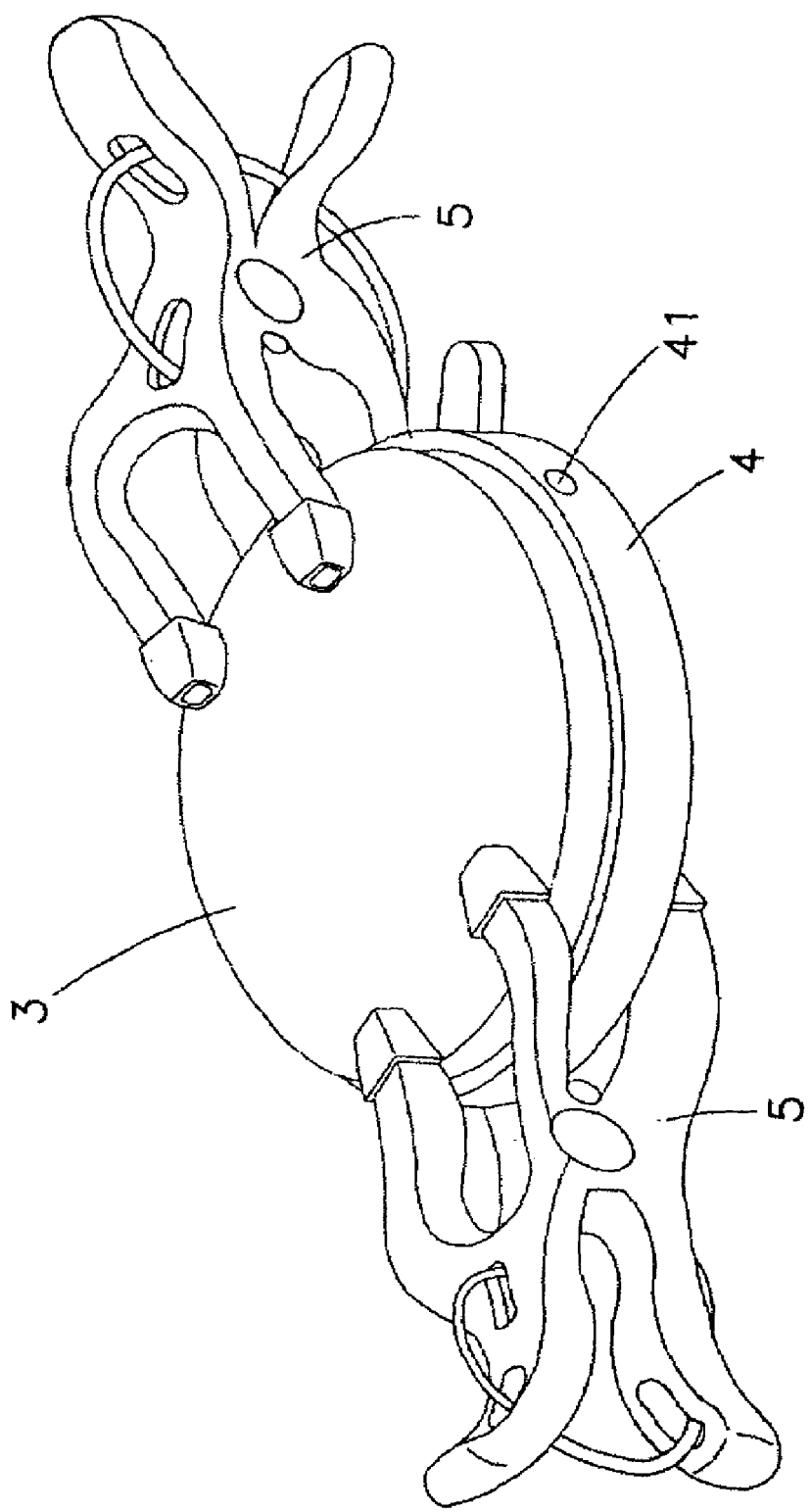
FIG. 2 is a stereo appearance illustration of the current invention.
Figure 3:
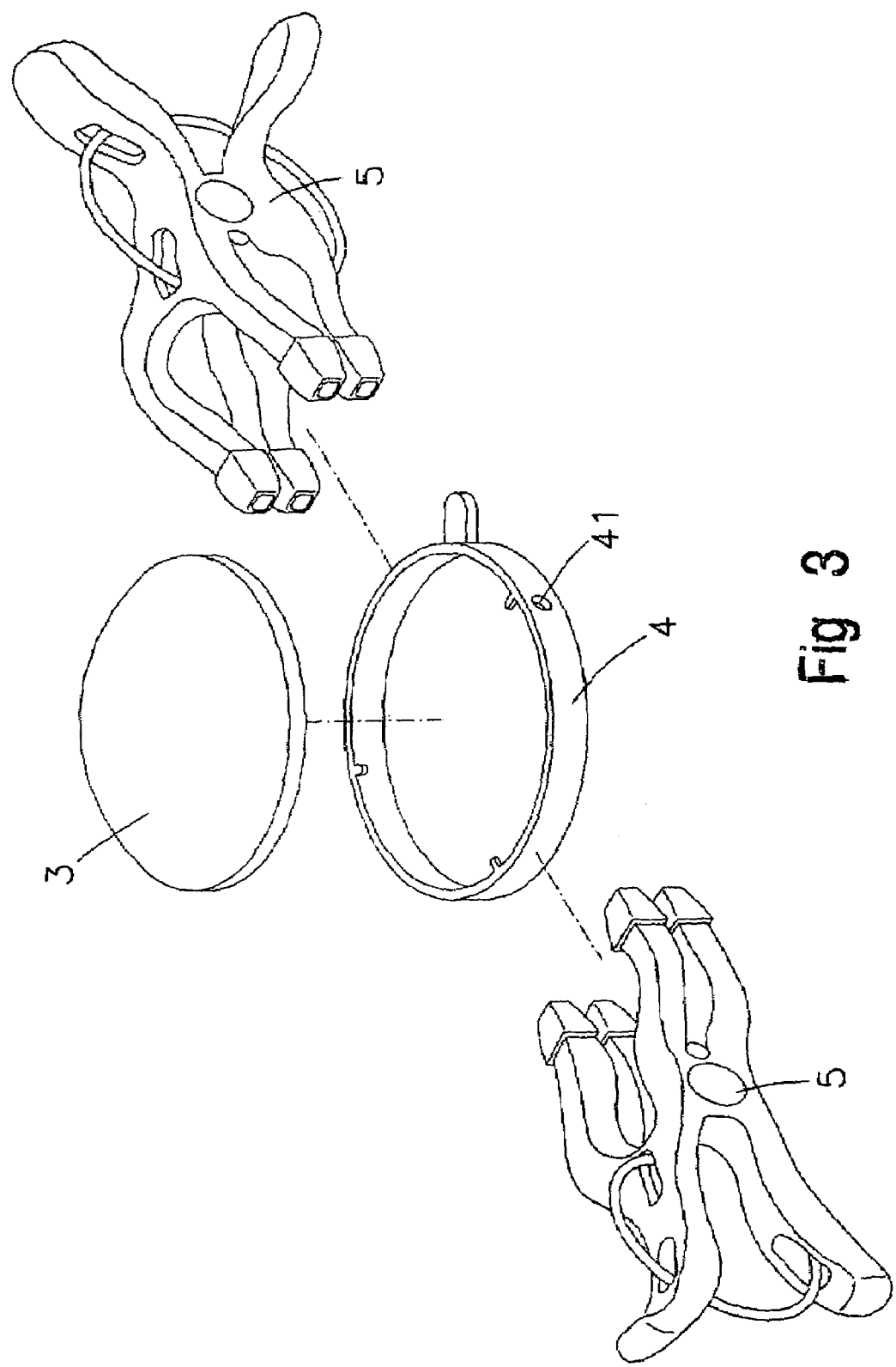
FIG. 3 is stereo appearance decomposition drawing of the current invention.

Please refer to the attached drawings, the structural improvement of the polarized optical lens of the current invention is as shown in FIGS. 2 and 3, the structural improvement of the polarized optical lens comprising of an optical lens (1) of certain curvature and an polarized optical thin film (23).

Figure 4:
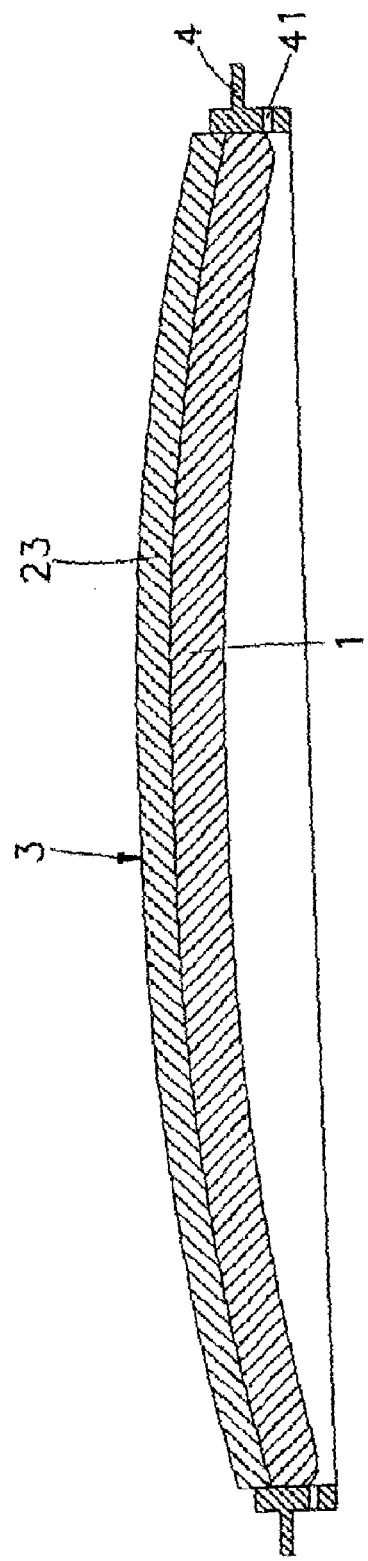
FIG. 4 is the cross-sectional view of the current invention.
Figure 5:
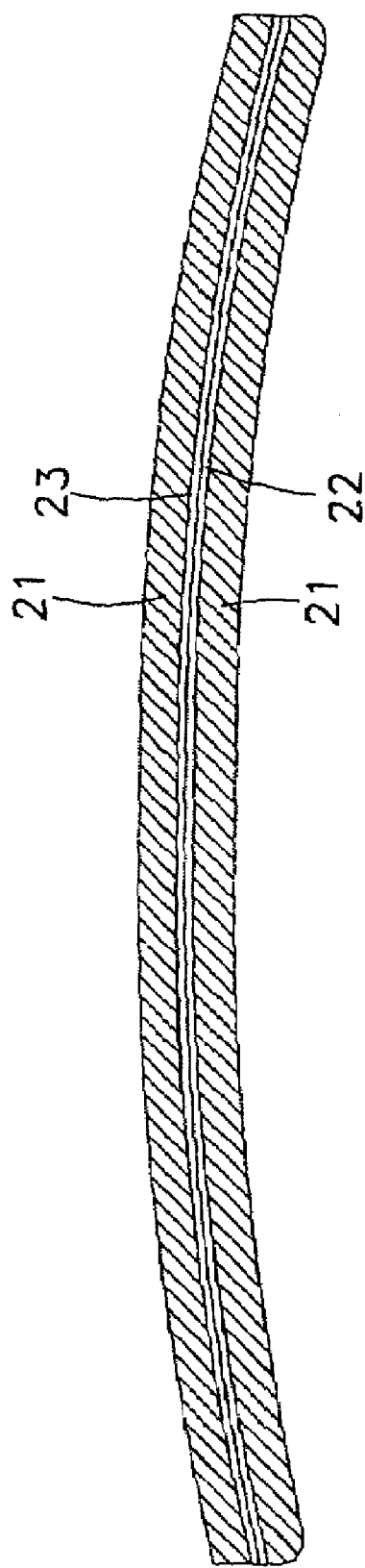
FIG. 5 is the structure of the polarized piece of the current invention.

For the manufacturing method of the current invention, a polarized piece (2) comprising of cellulose protective film (21), adhesive (22) and polarized film (23) is first formed, its layer structure from top to bottom is in such order as: cellulose protective film (21), polarized thin film (23), adhesive (22) and cellulose protective film (21), the polarized piece is then placed in a mold for pressing to a curvature similar to optical lens (1), then the cellulose protective film (21) of polarized piece (2) is peeled off, the polarized film (23) can be placed on the optical mold of plastic injected machine, adhesive (22) and pressure is used to paste it to the plastic injected optical lens (1), the polarized film (23) then fully covers the outer surface of the optical lens (1), then place this synthesized lens (3) in the ring (4) of the optical mold, light adjusting and color changing liquid colophony is injected through through-hole (41) of ring (4), then clamp (5) is used to clamp tight the synthesized lens (3) and light adjusting and color changing liquid colophony, wait until it solidifies and a shape is formed, this is as shown in FIGS. 4 and 5, the polarized optical lens such made is of thinner and lighter characteristic, it can effectively reduce the manufacturing cost, furthermore, diversified function and light adjustability and color changeability function can be reached, optical lens (1) is also equipped with polarized effect. Finally, our goal is to let the lens achieve world class level quality, when the glass is worn outdoors, the lens could generate dark and light change due to the absorption of UV light, the lens (1) thus possesses diversified color.

The material for the optical lens (1) of the current invention can be optical materials such as: PA, PC, AC or OPET, it is not used to limit the application scope of the current invention, it can isolate UV light and prevent the direct exposure of the eyes to the UV light, meanwhile, the surface of the polarized thin film (23) can be hardened to prevent inappropriate scratches generated on the lens surface and to achieve lens protection purpose.

The above-mentioned polarized thin film (23) can also be pasted to the inner surface of the optical lens (1) to let polarized thin film (23) fully cover the inner surface of the optical lens (1).

Besides, for polarized thin film (23) and optical lens (1), it could be that part of the polarized thin film (23) pasted to the outer surface of optical lens (1), and part of the polarized thin film (23) pressed and pasted to cover the inner surface of the optical lens (1).

Therefore, the structure of the designed polarized optical lens of the current invention has the characteristics of thinner in thickness and lighter in weight, it can effectively reduce production and materials cost, it also let the user feel more comfortable while wearing it, it not only has the function of light adjustment and color change and let the optical lens have the polarization effect, but also reaches the world class lens grade, when it is worn outdoors by the user, the lens will generate dark and light change due to the absorption of UV light, it lets the users have more choices and enhance their purchase desire, furthermore, the current invention can prevent from generating inappropriate scratches, it isolate UV light to hit the user's eyes directly.

Although special embodiment of the current invention has been described as in the above, it is only used to help the reader of this patent to better understanding on the practice of the current invention, it is not used to limit the spirit of the current invention, for those who are skilled in the art can make several different but equivalent modifications with the help of descriptions disclosed here without deviating from the spirit scope of the current invention, therefore, the scope of the current invention is defined by the claims attached below.

To summarize the above descriptions, we know that the current invention has a wide application scope and there is no similar invention or publication. Therefore, it should meet the application requirement of an invention patent and we thus file an application. However, the descriptions above are only the preferred embodiments of the current invention and any equivalent structural change through the use of the specification and drawings of the current invention should be enclosed in the scope of the current invention in a similar reason.

Specific Drawing (1) The specified representative figure of the current invention is: FIG. 2

(2) Brief description of the component symbol of the representative figure:

| Synthesized figure | (3) | Ring | (4) |
| Through-hole | (41) | Clamp | (5) |

Description Of Min Components

| Optical lens | (1) | Polarized piece | (2) |
| Cellulose protective film | (21) | Adhesive | (22) |
| Polarized thin film | (23) | Synthesized lens | (3) |
| ring | (4) | Through-hole | (41) |
| clamp | (5) | | |
| Optical lens | (A) | Polarized piece | (B) |

What is claimed is:

1. A polarized optical lens formed by the method of:
   providing a synthesized lens formed from a polarized thin film and an optical lens;
   providing a ring, to accommodate the synthesized lens, the ring being installed with a through-hole, which is injected with light adjustment and color change liquid resin paint;
   providing a clamp, used to clamp and accommodate the synthesized lens inside the ring,
   wherein, first, a cellulose protective film, adhesive and the polarized thin film are used to form a polarized piece, the polarized piece is then pressed to a matched curvature with the optical lens, then the cellulose protective film is peeled off to expose the adhesive on the polarized thin film, then the adhesive is pressed to the optical lens so that the polarized thin film is attached to the optical lens, then a synthesized optical lens and polarizing thin film combination is placed in the ring, the light adjustment and color change liquid resin paint is then injected through the through-hole in the ring, then through the clamping of the synthesized lens with the light adjustment and color change liquid resin paint, an optical lens having light adjustment and color change characteristics is thus injected and plasticized.

2. A polarized optical lens formed by the method of claim 1, wherein the polarized thin film is adhered to an outer surface of the optical lens.

3. A polarized optical lens formed by the method of claim 1, wherein the polarizing thin film is adhered to an inner surface of the optical lens.

4. A polarized optical lens formed by the method of claim 1, wherein the polarized thin film fully covers one side of the optical lens.

5. A polarized optical lens formed by the method of claim 1, wherein the polarized thin film partially covers one side of optical lens.

6. A polarized optical lens formed by the method of claim 1, wherein the optical lens comprises Polyamide (PA).

7. A polarized optical lens formed by the method of claim 1, wherein the surface of polarized thin film is hardness-enhancing treated to avoid scratching.

* * * * *